H. W. JONKHOFF.
TRACTOR TRAIN.
APPLICATION FILED MAY 3, 1922.
1,436,658.
Patented Nov. 28, 1922.
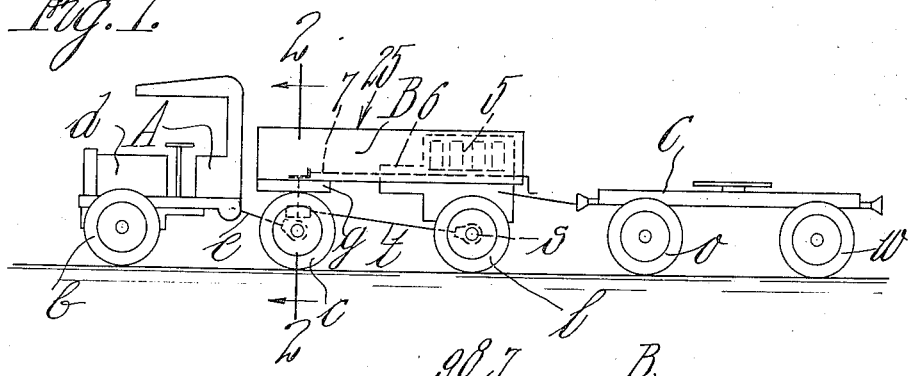
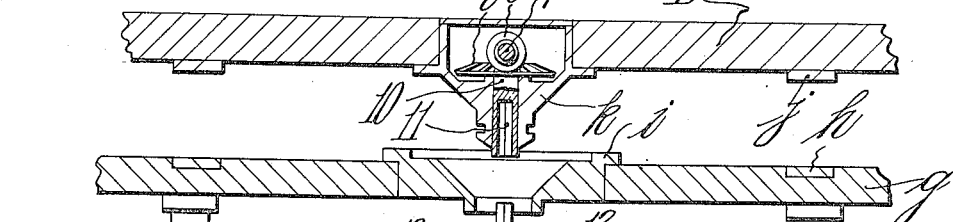
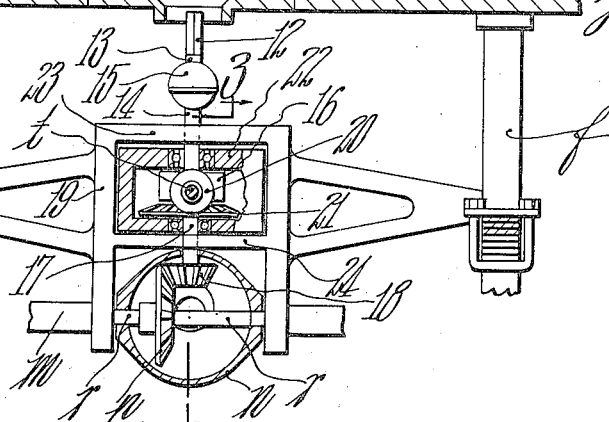
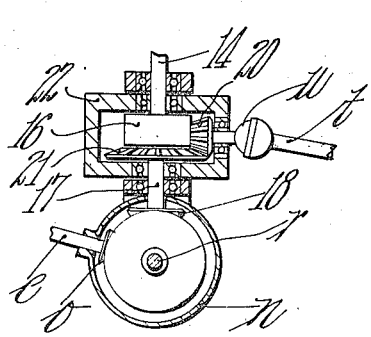
INVENTOR
Henri W. Jonkhoff.
BY Chapin & Neal
ATTORNEYS Patented Nov. 28, 1922.

1,436,658

UNITED STATES PATENT OFFICE.

HENRI W. JONKHOFF, OF SAMARANG, JAVA, DUTCH EAST INDIES.

TRACTOR TRAIN.

Application filed May 3, 1922. Serial No. 558,056.

*To all whom it may concern:*

Be it known that I, HENRI W. JONKHOFF, a subject of the Queen of Holland, residing at Samarang, Java, Dutch East Indies, have invented new and useful Improvements in Tractor Trains, of which the following is a specification.

This invention relates to improvements in tractor-trains and is more particularly concerned with that type of tractor train utilizing a trailer, the forward end of which is pivotally supported by a fifth wheel element from the rear end of the tractor.

The invention contemplates the provision of a coupled tractor-trailer, of the type defined, which may be used, as occasion requires, to draw other trailers. Added motive power is thus required, which might be obtained by increasing the size of the tractor motor. To do this, however, would result in undesirable and disproportionate dead weight by increasing the strength of the tractor chassis and other parts. Also, a greater load on the trailer is required to secure the necessary increase in pressure on the tractor driving wheels in order that the increased power may be utilized without causing slippage of the driving wheels. To carry a greater load the trailer loading surface would need to be increased, and, since no more than half the load on the trailer is imposed upon the tractor driving wheels, the increase in loading surface would need to provide for an increase in load of double the weight needed on the tractor driving wheels. This means a long trailer body, the wheels of which are spaced from the tractor driving wheels by a distance considerably greater than the latter are spaced from the tractor steering wheels. Such a combination of vehicles, having unequal wheel bases, is hard to steer.

To avoid these difficulties, the extra power desired may be secured by mounting a second motor on the trailer chassis and disposing it approximately above the rear wheels of the trailer, and such wheels may be driven to obtain extra driving wheels, so that excessive wheel pressure is avoided. With this arrangement all the load on the trailer is brought to bear on driving wheels and there is a much better distribution of dead weight between the coupled vehicles than would be the case if the tractor motor were increased in size. Moreover, the desired uniformity in wheel base can be maintained.

This invention has for its object to provide a coupled tractor and trailer unit wherein a motor is provided on the trailer and connections are made from this motor to the tractor driving mechanism and from such mechanism to the rear wheels of the trailer, so that either motor or both in conjunction, may drive the rear wheels of both trailer and tractor.

Another object of the invention is to transmit the power from the trailer motor to the tractor driving wheels through the vertical axis of the pivotal connection between the coupled tractor and trailer to permit relative turning between the coupled vehicles.

Another object of the invention is to interpose in the driving connections between the two motors, a differential for the purpose of compensating for possible inequalities in the speeds of the two motors.

Another object of the invention is to provide in the vertically disposed portion of the driving mechanism extending through the pivotal connection between the two vehicles, a sliding connection to permit free action of the springs supporting the forward end of the trailer chassis.

Another object is to interpose, in the driving connections just named, means such as a universal joint, to compensate for unequal compression of the front and rear supporting springs for the tractor chassis.

Other objects and advantages will appear in the following description and in the illustrative embodiment of the invention in the accompanying drawings, in which:

Fig. 1 is a diagrammatical view of a tractor train embodying the invention;

Fig. 2 is a cross-sectional view taken on the line 2—2 of Fig. 1; and

Fig. 3 is a fragmentary elevational view taken on the line 3—3 of Fig. 2.

Referring to these drawings; the coupled tractor and trailer are of the general type disclosed in U. S. Letters Patent No. 1,018,248 granted February 20, 1912 to Charles H. Martin and inasmuch as this invention is concerned primarily with the driving mechanism for the coupled vehicles and not with the tractor-trailer construction per se, the illustration of the coupled vehicles in Fig. 1 has been confined to a diagrammatical and more or less conventional showing, reference being made to the above mentioned patent for a more complete disclosure.

For the present purposes it will suffice to state that A is a suitable tractor having front steering wheels b, and rear driving wheels c, the latter being driven from the power plant d of the tractor by suitable means exemplified in part and conventionally, at e. The rear end of the tractor is provided with springs f (Fig. 2) which support a fifth wheel platform g, carrying a fifth wheel h, and a center plate i. The trailer is represented at B and is supported at its forward end by a fifth wheel j resting on the fifth wheel h and is coupled to the tractor by a center plate k which engages in the plate i and permits relative turning between the coupled vehicles. The rear end of the trailer B is supported by wheels l through the intermediary of the usual springs (not shown herein but exemplified in the Martin patent above mentioned.)

The rear axle construction of the tractor A is of usual known form and much of it has been omitted from the drawing as unnecessary to an understanding of the invention. It includes a suitable housing m and a centrally disposed differential housing n, in which is located the driving bevel pinion o and the driven bevel gear p. The latter drives live rear axles r in the usual way, not shown.

According to this invention, a second motor 5 is located on the trailer B and preferably as nearly as possible over the rear axle s of the trailer, which rear axle is of standard known construction and analogous to that just described. The motor 5, through a usual type of transmission and control device 6 operates the drive shaft 7, all these elements being mounted to move with the trailer chassis. To connect shaft 7 to the driven gear p of the tractor rear axle the following means are used which transmit the power through a vertical line coincidental with the pivotal axis of the coupling devices i and k. A bevel pinion 8, fixed to shaft 7, drives a bevel gear 9 fixed to a vertical shaft 10 mounted centrally in center plate k and having a socket 11 therein of polygonal cross-section. Slidably received in this socket and capable of limited vertical movement therein is a member 12 also of polygonal cross-section and formed on the end of a shaft 13. The latter is connected to a vertical shaft 14 through the intermediary of a universal joint, conventionally indicated at 15, and the shaft 14, through the intermediary of a differential, conventionally indicated at 16, drives another vertical shaft 17 which extends into casing n and carries a bevel pinion 18 to mesh with gear p. The shafts 14 and 17 are mounted in a bridge member 19 suitably secured to and movable with the rear axle housing m.

Thus, the two power plants d and 5 are interconnected and by the usual control devices included in the tractor A and in the casing 6, either motor, or both, may be brought into play to drive the rear wheels of the tractor. The differential 16 compensates for variations in speed of the two motors when both are operating in conjunction. The sliding connection 11, 12, compensates for compression of springs f and leaves them entirely free to perform their intended function. The universal joint 15 compensates for variations in alignment of the shafts 13 and 14, which occur during various conditions of operation.

To connect the driving mechanism of the rear axle s to the driving mechanism described, the usual centrally located drive shaft t for the first named mechanism is provided at its forward end with a bevel pinion 20 which meshes with a bevel gear 21 fixed to the vertical shaft 17, already described. A universal joint u is preferably included in the drive shaft t. The forward end of the latter is supported by a member 22 which is oscillatable about the shafts 14 and 17 and held in proper vertical position between the parts 23 and 24 of bridge 19. This member 22 may advantageously constitute a casing, as shown, to house the gears 20 and 21 together with the differential 16. The member 22 permits the relative turning movements between the coupled vehicles without interruption of the driving connections.

The coupled vehicles described constitute a six wheel tractor in which the three pairs of wheels are equally spaced, which is desirable for steering purposes. The trailer B may be provided with a suitable loading surface 25 and additional loads may be carried by other trailers such as C, which are coupled to the trailer B. The front and rear wheels v and w are preferably spaced from one another and the front wheels v are preferably spaced from the rear wheels l of trailer B, by a distance equal to the wheel base of tractor A.

The invention has been disclosed herein, in an embodiment at present preferred, for illustrative purposes but the scope of the invention is defined by the appended claims rather than by the foregoing description.

Claims:

1. In combination, a tractor having a motor, rear driving wheels and mechanism for driving the latter from the motor; a trailer having rear supporting wheels and having its forward end supported from the rear end of the tractor and pivotally connected thereto for relative horizontal turning movements; a motor on the trailer and connections between such motor and the first named driving mechanism, a part of said connections disposed coincidentally with the axis of said pivotal connection.

2. In combination, a tractor having a motor, rear driving wheels and mechanism for driving the latter from the motor; a trailer having rear supporting and driving wheels and having its forward end supported from the rear end of the tractor and pivotally connected thereto for relative horizontal turning movements; a motor on the trailer and connections between such motor and the first named driving mechanism, a part of said connections disposed coincidentally with the axis of said pivotal connection, and means for driving the trailer wheels from said connections.

3. In combination, a tractor having a motor, rear driving wheels and mechanism for driving the latter from the motor; a trailer having rear supporting and driving wheels and having its forward end supported from the rear end of the tractor and pivotally connected thereto for relative horizontal turning movements; a motor on the trailer and connections between such motor and the first named driving mechanism, a part of said connections disposed coincidentally with the axis of said pivotal connection, and means connecting the trailer driving wheels to said part of the last-named connections.

4. In combination, a tractor having a motor, rear driving wheels and mechanism for driving the latter from the motor; a trailer having rear supporting wheels and having its forward end supported from the rear end of the tractor and pivotally connected thereto for relative horizontal turning movements; a motor on the trailer and connections between such motor and the first named driving mechanism, a part of said connections extending through and located coincidentally with said pivotal connection, and a differential interposed in said connections.

5. In combination, a tractor having a motor, rear driving wheels, mechanism for driving the latter from the motor, and a fifth wheel platform located above and spring supported from the axle of said driving wheels; a trailer having rear supporting wheels and having its forward end supported from said platform and pivotally connected thereto for relative horizontal turning movements; a motor on the trailer, means disposed in part coincidentally with the axis of said pivotal connection for connecting said motor to said driving mechanism, and means interposed in said part of said connecting means to permit relative vertical movements between said axle and platform.

6. In combination, a tractor having a motor, rear driving wheels, mechanism for driving the latter from the motor and a fifth wheel platform located above and spring supported from the axle of said driving wheels; a trailer having rear supporting wheels and having its forward end supported from said platform and pivotally connected thereto for relative horizontal turning movements; a motor on the trailer, means disposed in part coincidentally with the axis of said pivotal connection for connecting said motor to said driving mechanism, and a universal joint interposed in said part of said connecting means.

7. In combination, a tractor having a motor, rear driving wheels, mechanism for driving the latter from the motor, and a fifth wheel platform, a trailer having rear driving wheels and means for supporting its forward end from said platform and pivotally connecting it thereto for horizontal turning movements, a shaft driven from said mechanism and disposed substantially vertically and coincidentally with the axis of said pivotal connection, a drive shaft for the trailer driving wheels and connected to said vertical shaft, and a member swivelled on the last named shaft and rotatably supporting the forward end of said drive shaft, and a motor carried by the trailer and connected to drive said vertical shaft.

In testimony whereof I have affixed my signature.

HENRI W. JONKHOFF.